(12) United States Patent
Zuniga et al.

(10) Patent No.: US 12,408,222 B2
(45) Date of Patent: Sep. 2, 2025

(54) MULTI-LINK OPERATION FOR WIRELESS LOCAL AREA NETWORK MULTI-LINK DEVICE

(71) Applicant: Cisco Technology, Inc., San Jose, CA (US)

(72) Inventors: Juan Carlos Zuniga, Montreal (CA); Pooya Monajemi, San Francisco, CA (US); Robert Edgar Barton, Richmond (CA); Matthew Aaron Silverman, Shaker Heights, OH (US); Jerome Henry, Pittsboro, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 375 days.

(21) Appl. No.: 18/181,963

(22) Filed: Mar. 10, 2023

(65) Prior Publication Data

US 2024/0015827 A1 Jan. 11, 2024

Related U.S. Application Data

(60) Provisional application No. 63/368,011, filed on Jul. 8, 2022.

(51) Int. Cl.
*H04W 76/15* (2018.01)
*H04W 84/12* (2009.01)

(52) U.S. Cl.
CPC ............ *H04W 76/15* (2018.02); *H04W 84/12* (2013.01)

(58) Field of Classification Search
CPC .............................. H04W 76/15; H04W 84/12
See application file for complete search history.

(56) References Cited

U.S. PATENT DOCUMENTS

| 2017/0078206 A1* | 3/2017 | Huang | .................... H04L 69/14 |
| 2017/0134261 A1* | 5/2017 | Seo | ......................... H04L 45/24 |
| 2019/0037473 A1* | 1/2019 | Taneja | .................. H04W 76/10 |

(Continued)

FOREIGN PATENT DOCUMENTS

WO 2022048441 A1 3/2022

OTHER PUBLICATIONS

Liu, et al., "Multipath Extension for QUIC," Internet Engineering Task Force (IETF), Internet-Draft, draft-ietf-quic-multipath-03, Oct. 2022, 27 pages.

(Continued)

*Primary Examiner* — Benjamin H Elliott, IV
(74) *Attorney, Agent, or Firm* — Edell, Shapiro & Finnan, LLC

(57) ABSTRACT

A method to operate a multi-link wireless device. The method includes establishing at least a first multi-link device interface and a second multi-link device interface, exposing, via a virtual data port, the first multi-link device interface and the second multi-link device interface at a data processing layer of the wireless device, selecting one of the first multi-link device interface and the second multi-link device interface, as a selected multi-link device interface, based on performance information associated with a first radio and a second radio associated, respectively, with the first multi-link device interface and the second multi-link device interface, and wirelessly transmitting a packet from the wireless device by routing the packet through the selected multi-link device interface.

20 Claims, 6 Drawing Sheets

(56) References Cited

U.S. PATENT DOCUMENTS

| | | | |
|---|---|---|---|
| 2019/0288935 A1* | 9/2019 | Sen | H04L 45/44 |
| 2020/0259904 A1* | 8/2020 | Dao | H04W 40/02 |
| 2020/0359439 A1* | 11/2020 | Qiao | H04W 40/246 |
| 2021/0037583 A1* | 2/2021 | Seok | H04W 76/15 |
| 2021/0243664 A1* | 8/2021 | Huang-Fu | H04W 76/11 |
| 2021/0274489 A1* | 9/2021 | Fang | H04W 72/0446 |
| 2021/0282119 A1* | 9/2021 | Asterjadhi | H04W 76/40 |
| 2021/0289442 A1* | 9/2021 | Naribole | H04W 52/0222 |
| 2021/0400753 A1* | 12/2021 | Salkintzis | H04W 28/24 |
| 2022/0132608 A1* | 4/2022 | Chu | H04W 76/15 |
| 2022/0210692 A1* | 6/2022 | Yilmaz | H04W 76/15 |
| 2022/0264429 A1* | 8/2022 | Gan | H04W 52/028 |
| 2022/0322841 A1 | 10/2022 | Maurer | |
| 2023/0011612 A1* | 1/2023 | Patil | H04L 1/1614 |
| 2023/0217492 A1* | 7/2023 | Garcia Rodriguez | H04W 74/0816 370/329 |
| 2023/0247696 A1* | 8/2023 | Nagarajan | H04W 76/15 370/328 |
| 2023/0292240 A1* | 9/2023 | Naribole | H04W 52/028 |
| 2023/0389000 A1* | 11/2023 | Dong | H04W 56/0045 |
| 2023/0389101 A1* | 11/2023 | Hong | H04W 48/16 |
| 2024/0015827 A1* | 1/2024 | Zuniga | H04W 76/15 |

OTHER PUBLICATIONS

Gautam, et al., "LTE Wi Fi Aggregation Solutions and Congestion Control Management in MPTCP," 4th International Conference on Cyber Security and privacy in communication networks (ICCS) 2018, Oct. 2018, 7 pages.

\* cited by examiner

MULTI-LINK OPERATION FOR WIRELESS LOCAL AREA NETWORK MULTI-LINK DEVICE

This application claims the benefit of U.S. Provisional Patent Application No. 63/368,011, filed Jul. 8, 2022, the subject matter of which is incorporated herein by reference.

TECHNICAL FIELD

The present disclosure relates to wireless local area network (WLAN) operations including endpoints that are capable of multi-link operations.

BACKGROUND

The Institute of Electrical and Electronics Engineers (IEEE) standards association publishes the 802.11 standard that covers WLAN Medium Access Control (MAC) and Physical Layer (PHY) specifications. The 802.11 standard has evolved from single radio to multi-radio technology, with multi-link operation (MLO) features introduced by the 802.11be amendment.

MLO is supported by the introduction of functionality for a multi-link device (MLD), also referred to as "upper MAC" functionality, which takes care of linking multiple radio entities, i.e., an access point (AP) or non-AP stations (STAs), with a single MLD function that enables interfacing with upper layers of a multi-layer abstraction of communications between computing devices. One such multi-layer abstraction is the Open Systems Interconnection model (OSI model) that defines several abstraction layers including the Physical, Data Link, Network, Transport, Session, Presentation, and Application layers.

DETAILED DESCRIPTION

Overview

A method to operate a multi-link wireless device is disclosed herein. The method may include establishing at least a first multi-link device interface and a second multi-link device interface, exposing, via a virtual data port, the first multi-link device interface and the second multi-link device interface at a data processing layer of the wireless device, selecting one of the first multi-link device interface and the second multi-link device interface, as a selected multi-link device interface, based on performance information associated with a first radio and a second radio associated, respectively, with the first multi-link device interface and the second multi-link device interface, and wirelessly transmitting a packet from the wireless device by routing the packet through the selected multi-link device interface.

In another embodiment, a device is provided. The device includes an interface configured to enable network communications, a memory, and one or more processors coupled to the interface and the memory, and configured to: establish at least a first multi-link device interface and a second multi-link device interface, expose, via a virtual data port, the first multi-link device interface and the second multi-link device interface at a data processing layer of the wireless device, select one of the first multi-link device interface and the second multi-link device interface, as a selected multi-link device interface, based on performance information associated with a first radio and a second radio associated, respectively, with the first multi-link device interface and the second multi-link device interface, and wireless transmitting a packet from the wireless device by routing the packet through the selected multi-link device interface.

Example Embodiments

Given the evolution of WLANs, e.g., IEEE 802ac/5, ax/6, be/7), and with the support of new spectrum bands, WLAN technology (e.g., Wi-Fi) can provide multiple concurrent radio access connectivity. However, the current 802.11 architecture limits this type of functionality, as the radio access network is hidden from upper layer applications. As a result, the upper layer applications, which may have a good understanding of their performance needs (e.g., jitter, delay, etc.), end up having to choose between two interfaces (e.g., LTE and Wi-Fi), or have no choice (Wi-Fi is the only available medium), and are only presented with an interface that attempts to establish one or more Wi-Fi links based on L2 buffer status (and irrespective of upper layer application needs).

As will be explained below in more detail, the embodiments described herein provide a mechanism to expose lower layer constructs to an upper layer, thus letting the upper layer(s) dynamically use the lower layer's interfaces based on their (i.e., the upper layers') knowledge of a given application's needs.

Figure 1:
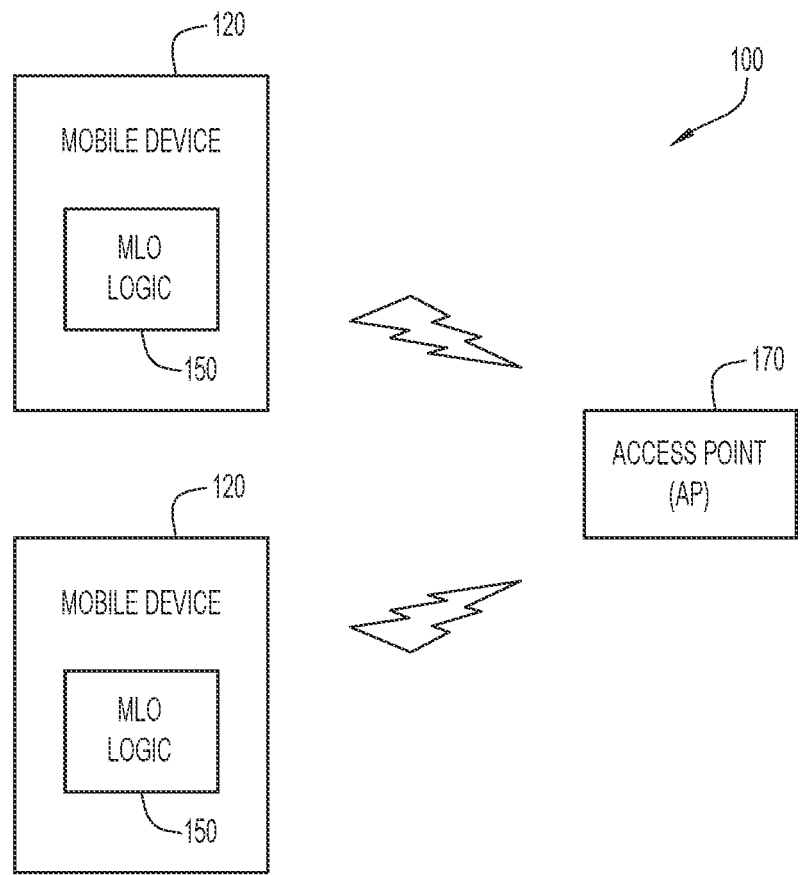
FIG. 1 shows a WLAN including at least one mobile device with an instance of multi-link operation (MLO) logic hosted thereon, according to an example embodiment.

Reference is now made to the figures, beginning with FIG. 1, which shows a WLAN 100 including at least one mobile device 120 with an instance of multi-link operation (MLO) logic 150 hosted thereon, and an access point (AP) 170 that communicates wirelessly with any given mobile device 120, according to an example embodiment. AP 170 is also configured to operate as a multi-link device. In an embodiment, MLO logic 150 is configured to provide data and control plane separation within the context of a WLAN architecture (such as one configured in accordance with IEEE 802.11 standards), enabling the system to leverage the advantages of control plane frame exchanges, but exposing multiple data plane connectivity channels to upper layers, thereby allowing the upper layers to more intelligently select lower-layer MLD interfaces for transmission.

In accordance with an embodiment, MLO logic 150 directly exposes multiple data interfaces to the upper layers, i.e., application running on mobile device 120. This exposure may be via, e.g., the Logical Link Control, or LLC layer 226 (FIG. 2), which is the upper sub-layer of the Data Link Layer. The purpose of the LLC layer is to act as an interface between the Network layer 230 and the MAC layer 224 of the Data Link layer 220.

In other words, an objective of MLO logic 150 is to provide a mechanism by which upper layer protocols (e.g., the LLC layer) can become aware of characteristics of the 802.11 MAC and Physical layer interfaces that may be available on mobile device 120, thereby giving mobile device 120 a greater opportunity to transmit more efficiently with better application performance.

Figure 2:
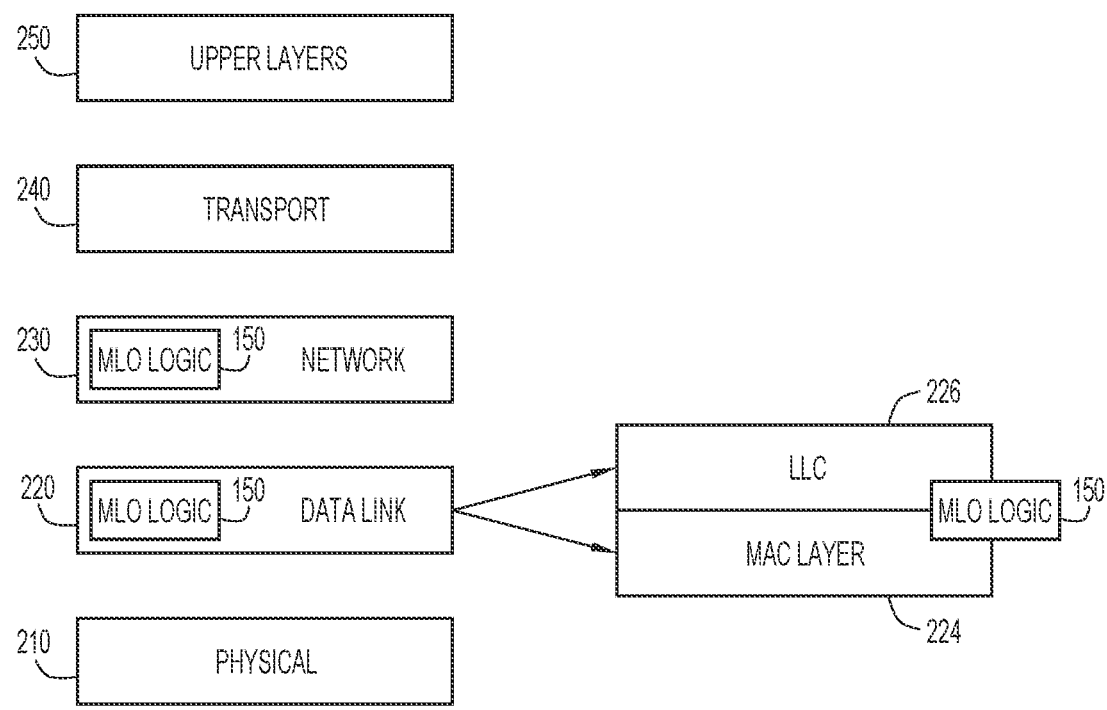
FIG. 2 shows selected layers of a portion of a multi-layer abstraction for enabling communications between two computing devices and locations at which MLO logic may be instantiated, according to an example embodiment.

FIG. 2 shows selected layers of a portion of a multi-layer abstraction for enabling communications between two computing devices and locations at which MLO logic 150 may be instantiated, according to an example embodiment. More specifically, FIG. 2 shows several layers of the OSI model including Physical layer 210, Data Link layer 220, Network layer 230, Transport layer 240, and Upper layers 250 (such as a Presentation and/or Application layer). Further shown in FIG. 2 is how Data Link layer 220 may be broken down logically into MAC layer 224 and a Logical Link Control, or LLC layer 226. As shown in the figure, MLO logic 150, in one embodiment, is logically disposed between MAC layer 224 and LLC layer 226. In another embodiment MLO logic 150 may be disposed, not in the Data Link layer 220, but instead at the Network layer 230. In an embodiment, MLO logic 150 may be implemented in software and/or hardware and is configured to "reach into" the MAC layer 224 and Physical layer 210 to obtain status information regarding individual links/radios operating on mobile device 120, and to use that status information to help select a given path (i.e., radio link) for packets supplied by upper layers.

Figure 3:
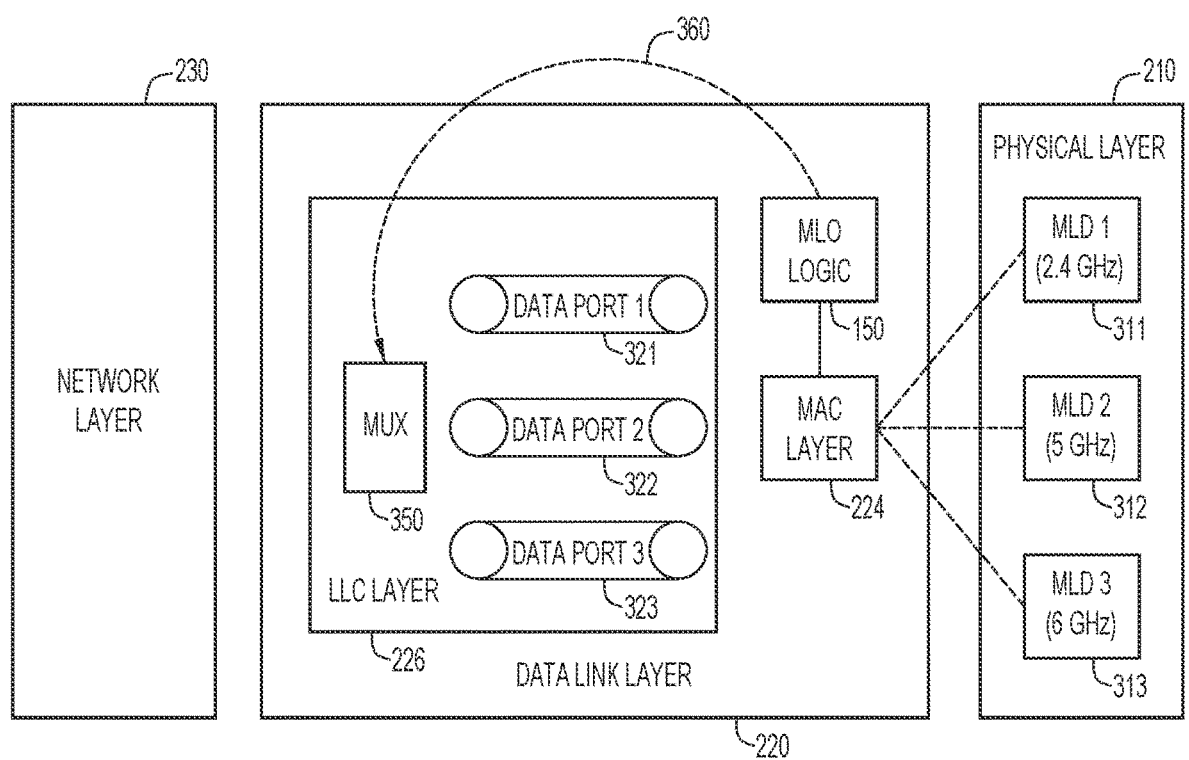
FIG. 3 shows how MLO logic exposes individual radio links as individual data ports to upper layers of a multi-layer abstraction for enabling communications between two computing devices, according to an example embodiment.

FIG. 3 shows how MLO logic 150 exposes individual links as individual data ports to upper layers of a multi-layer abstraction for enabling communications between two computing devices, according to an example embodiment. As depicted, mobile device 120 supports multiple MLDs, e.g., MLD 1 311, MLD 2 312, and MLD 3 313. These MLDs may be physical radios operating at, e.g., 2.4 GHz, 5 GHz and 6 GHz, respectively. The MLDs may also be known to those skilled in the art as Service Access Points (SAPs). MLO logic 150 exposes each of the MLDs as a virtual interface at the LLC layer 226, in the form of data ports, namely Data Port 1 321, Data Port 2 322 and Data Port 3 323. In an embodiment, each MLD may be associated to a different channel and a single link (e.g., 2.4 GHz for MLD 1 311, 5 GHz for MLD 2 312, and 6 GHz for MLD 3 313, etc.).

In an embodiment, as performance initialization procedures are started by the operating system or applications executing on mobile device 120, characteristics and differences of each MLD are exposed by the LLC layer 226 to upper layers, e.g., the Network layer 230.

To facilitate the exposure, LLC layer 226 (via MLO logic 150) creates a data interface/port corresponding to each MLD/SAP at the lower layers. As such, when a packet leaves the Network layer 230, and enters LLC layer 226, an arbitration/load balancing function at this layer, shown as multiplexer (MUX) 350 in FIG. 3, is configured to select a suitable data interface (data port) to transmit the packet for encapsulation at the MAC layer 224.

There are multiple ways to achieve the foregoing. In one embodiment, the data port interfaces exposed at the LLC layer 226 do not involve new IP addresses, but are rather L2 connections to the MAC layer 224. In this case, MAC layer 224 provides key PHY and MAC information back to the LLC layer 226 (shown by arrow 360) that the LLC layer 226 (and, particularly, multiplexer 350) uses to intelligently direct traffic to the most appropriate MLD/SAP, i.e., data port. Information that is relayed back to LLC layer 226 via MLO logic 150 may include the following:

Number of retries on each radio interface

Channel Utilization (CU) for each radio interface

Current interface data rate for each radio interface

Average hold buffer hold time for each MLD interface

With currently available MLO systems, the LLC layer 226 or other upper layers have no knowledge of such Physical layer 210 details, and can only direct packets to an MLD/SAP based on Traffic Identifier (TID)/quality of service (QoS) information. By supplying the aforementioned lower layer information, the LLC layer 226 is provided a much clearer picture of what is happening with each MLD, allowing the LLC layer 226, via MLO logic 150, to choose the best MLD rather than defaulting to a fixed TID to MLD mapping function.

As the Network layer 230 forwards packets to the Data Link layer 220, a load balancing and arbitration mechanism at the LLC layer 226, executed by MLO logic 150, assesses the metrics collected from the lower layers (i.e., MAC layer 224 and Physical layer 210) and assigns floating weights to each data port, updated from the LLC layer 226 in, or close to, real-time. Based on this information, the LLC layer 226 first evaluates each data port's ability to support the QoS requirements of various TID levels. This is likely to change over time as RF conditions change, so the load balancing weights/values are meant to be updated in near real-time. For example, based on current network conditions, MLD 3 313 may be capable of Real-Time, Ultra Low Latency Traffic, whereas MLD 2 312 may be only capable of Real-Time, but not Ultra Low Latency Traffic, and MLD 1 311 is capable of only non-Real-Time Traffic. This assessment is made in a semi-continuous mode, as new information is received from the lower layers and MLO logic 150 updates the load balancing mechanism.

In one embodiment, classification is based on a packet's QoS value (e.g., a packet's differentiated services code point (DSCP) value). This allows MLO logic 150 to determine which data port is best able to support the traffic type. After the assessment is made, the packet is forwarded on the appropriate data network port, towards the MAC layer 224 associated with the corresponding MLD/SAP in Physical layer 210.

Figure 4:
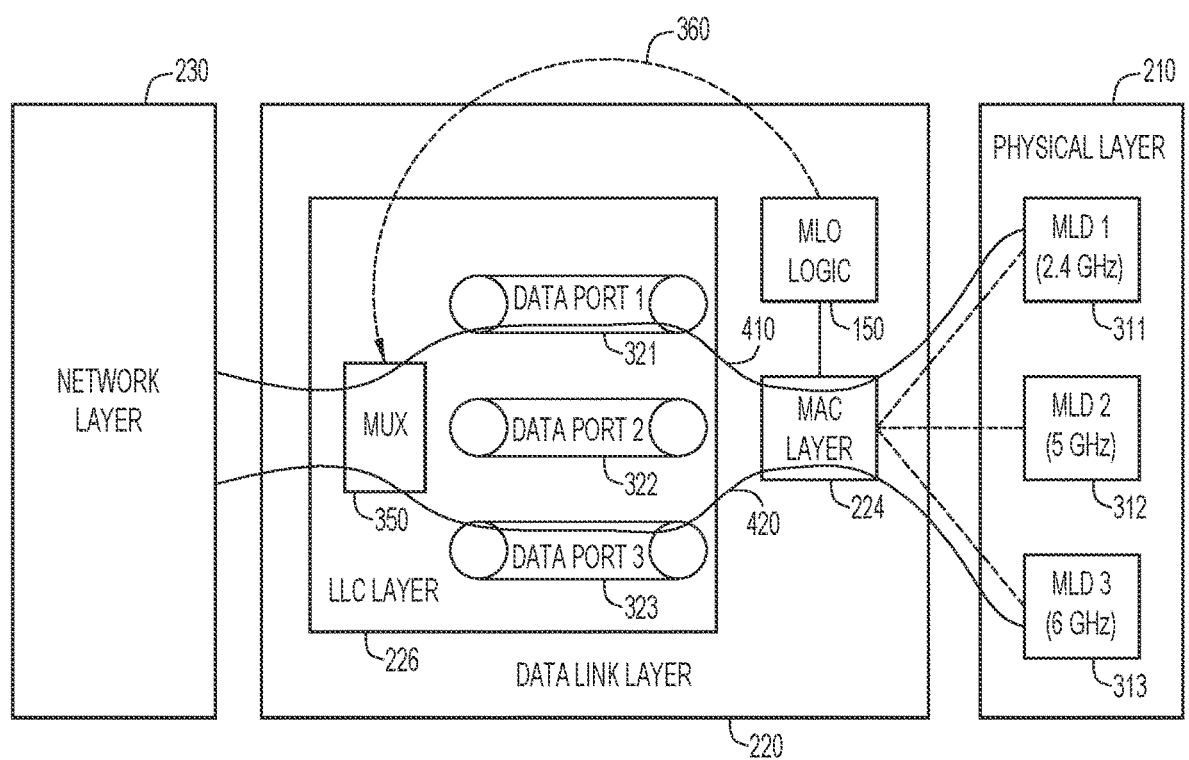
FIG. 4 illustrates how MLO logic might route different data flows, or portions of the same data flow, through respective data ports, according to an example embodiment.

In this regard, FIG. 4 illustrates how MLO logic 150 might route different data flows, or portions of the same data flow, through respective data ports, according to an example embodiment. As shown, a first flow 410 (or packet) is selected by MLO logic 150 and multiplexer 350 to pass through data port 1 321 to be supplied to MLD 1 311. On the other hand, second flow 420 (or packet) is selected by MLO logic 150 and multiplexer 350 to pass through data port 3 323 to be supplied to MLD 3 313.

One notable feature of the present embodiments is that each MLD interface may be associated with a TID or TID group (or even a DSCP value, which is visible on the IP packet header entering the LLC layer 226), although the MLDs share the same medium. For example, MLD 1 311 is in 2.4 GHz and 5 GHz, but handles Best Efforts (BE) and Background (BK) traffic and queues whereas MLD 2 312 is also in 2.4 GHz and 5 GHz, but handles the Video (VI) queue, whereas MLD 3 313 is also in 2.4 GHz and 5 GHz, but handles only the Voice (VO) queue).

The access characteristics of each queue translates in measurable performance differences between MLDs. This information is relayed through to the LLC layer 226, leading the process to naturally arbitrate traffic among the available virtual network ports, as discussed above.

In another embodiment, the division into multiple interfaces associated with the MLDs appears as virtual network ports at the Network layer 230 (see FIG. 2), rather than in the LLC layer 226. In this model, the traffic direction logic is managed by the Network layer 230, and the LLC layer 226 passes details of the Physical layer 210 and MAC layer 224 to an arbitration/load balancing function (similar to multiplexer 350) at the Network layer 230. In this case, the virtual ports created by the Network layer would use their own IP addresses.

Thus, those skilled in the art will appreciate that the embodiments described herein enable multiple MLDs/medium access control (MAC) service access points (SAP) to be exposed to the Logical Link Control (LLC) Layer, or other upper layer above a physical layer of layer abstraction that enables communication between devices. In this regard, the LLC layer 226, via MLO logic 150, collects PHY and MAC layer information about the physical radios and MLD interfaces. The LLC layer 226, or other upper layer, is configured to create data network ports corresponding to each MLD/SAP, and to forward traffic to these data ports. MLO logic 150 is also configured to determine which data interface is capable of handling different traffic types, based on current PHY and MAC conditions. And the overall approach is configured to forward different traffic classes to a LLC data port based on current traffic performance metrics.

Figure 5:
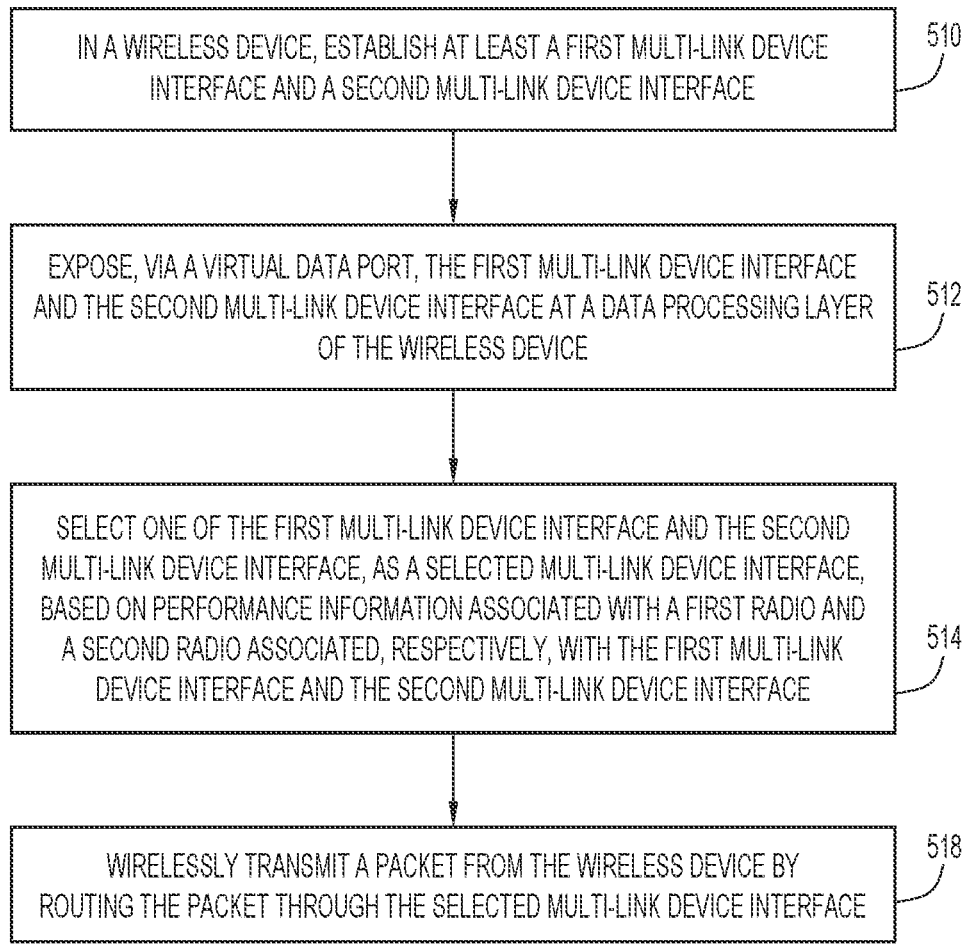
FIG. 5 shows a series of operations for executing MLO logic and routing data flows via different data ports, according to an example embodiment.

FIG. 5 shows a series of operations for executing MLO logic, according to an example embodiment. At 510, an operation includes, in a wireless device, establishing at least a first multi-link device interface and a second multi-link device interface. At 512, an operation includes exposing, via a virtual data port, the first multi-link device interface and the second multi-link device interface at a data processing layer of the wireless device. At 514, an operation includes selecting one of the first multi-link device interface and the second multi-link device interface, as a selected multi-link device interface, based on performance information associated with a first radio and a second radio associated, respectively, with the first multi-link device interface and the second multi-link device interface. And, at 518, an operation includes wirelessly transmitting a packet from the wireless device by routing the packet through the selected multi-link device interface.

Figure 6:
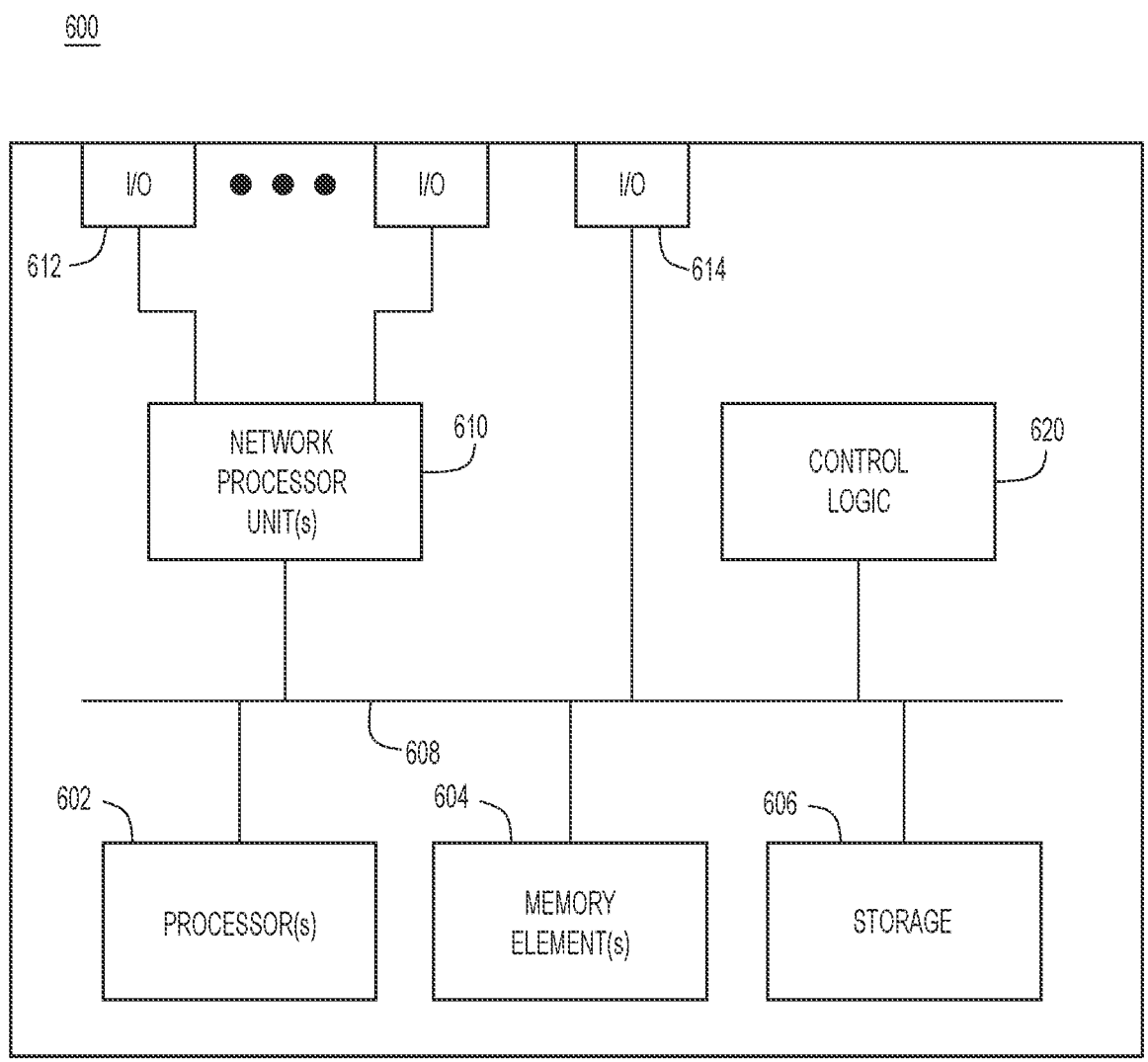
FIG. 6 is a block diagram of a computing device that may be configured to execute MLO logic and perform the techniques described herein, according to an example embodiment.

FIG. 6 is a block diagram of a computing device that may be configured to execute MLO logic 150 and perform the techniques described herein, according to an example embodiment. In various embodiments, a computing device, such as computing device 600 or any combination of computing devices 600, may be configured as any entity/entities as discussed for the techniques depicted in connection with FIGS. 1-5 in order to perform operations of the various techniques discussed herein.

In at least one embodiment, the computing device 600 may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620 (which could include, for example, MLO logic 150. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with memory element(s) 604 (or vice versa) or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 (wired and/or wireless) to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, any other I/O port(s), and/or antenna(s)/antenna array(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to computing device 600. For example, I/O interface(s) 614 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In sum, a method may include in a wireless device, establishing at least a first multi-link device interface and a second multi-link device interface, exposing, via a virtual data port, the first multi-link device interface and the second multi-link device interface at a data processing layer of the wireless device, selecting one of the first multi-link device interface and the second multi-link device interface, as a selected multi-link device interface, based on performance information associated with a first radio and a second radio associated, respectively, with the first multi-link device interface and the second multi-link device interface, and wirelessly transmitting a packet from the wireless device by routing the packet through the selected multi-link device interface.

In the method, the data processing layer may be a data link layer of an Open Systems Interconnection model.

In the method, the data processing layer may be a logical link control layer of the data link layer of the Open Systems Interconnection model.

In the method, the data processing layer may be a network layer of an Open Systems Interconnection model.

In the method, each of the first multi-link device interface and the second multi-link device interface may include a respective radio.

In the method, the performance information may include at least one of: a number of retries for each respective radio, a Channel Utilization (CU) for each respective radio, a current interface data rate for each respective radio, and an average buffer hold time for each respective radio.

In the method, each respective radio may transmit at at least one of 2.4 GHz, 5 GHz, and 6 GHz.

In the method, selecting one of the first multi-link device interface and the second multi-link device interface may be based on a type of traffic carried by the packet.

In the method, selecting one of the first multi-link device interface and the second multi-link device interface may be based on a quality of service indicated by the packet.

In the method, selecting one of the first multi-link device interface and the second multi-link device interface may be performed in substantially real-time and substantially continuously.

In another embodiment, a device may be provided and may include an interface configured to enable network communications, a memory, and one or more processors coupled to the interface and the memory, and configured to: establish at least a first multi-link device interface and a second multi-link device interface, expose, via a virtual data port, the first multi-link device interface and the second multi-link device interface at a data processing layer of the device, select one of the first multi-link device interface and the second multi-link device interface, as a selected multi-link device interface, based on performance information associated with a first radio and a second radio associated, respectively, with the first multi-link device interface and the second multi-link device interface, and wireless transmitting a packet from the device by routing the packet through the selected multi-link device interface.

In the device, the data processing layer may be a data link layer of an Open Systems Interconnection model.

In the device, the data processing layer may be a logical link control layer of the data link layer of the Open Systems Interconnection model.

In the device, the data processing layer may be a network layer of an Open Systems Interconnection model.

In the device, each of the first multi-link device interface and the second multi-link device interface may include a respective radio.

In the device, the performance information may include at least one of: a number of retries for each respective radio, a Channel Utilization (CU) for each respective radio, a current interface data rate for each respective radio, and an average buffer hold time for each respective radio.

In the device, each respective radio may transmit at at least one of 2.4 GHz, 5 GHz, and 6 GHz.

In yet another embodiment, one or more non-transitory computer readable storage media encoded with instructions are provided and that, when executed by a processor, cause the processor to: establish at least a first multi-link device interface and a second multi-link device interface, expose, via a virtual data port, the first multi-link device interface and the second multi-link device interface at a data processing layer of a wireless device, select one of the first multi-link device interface and the second multi-link device interface, as a selected multi-link device interface, based on performance information associated with a first radio and a second radio associated, respectively, with the first multi-link device interface and the second multi-link device interface, and wireless transmitting a packet from the wireless device by routing the packet through the selected multi-link device interface.

The instructions on the one or more non-transitory computer readable storage media may interact a radio of each of the first multi-link device interface and the second multi-link device interface.

The instructions on the one or more non-transitory computer readable storage media may obtain operate on performance information including at least one of: a number of retries for each respective radio, a Channel Utilization (CU) for each respective radio, a current interface data rate for each respective radio, and an average buffer hold time for each respective radio.

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   in a wireless device, establishing at least a first multi-link device interface and a second multi-link device interface;
   exposing, via a virtual data port, the first multi-link device interface and the second multi-link device interface at a data processing layer of the wireless device;
   selecting one of the first multi-link device interface and the second multi-link device interface, as a selected multi-link device interface, based on performance information associated with a first radio and a second radio associated, respectively, with the first multi-link device interface and the second multi-link device interface; and
   wirelessly transmitting a packet from the wireless device by routing the packet through the selected multi-link device interface.

2. The method of claim 1, wherein the data processing layer is a data link layer of an Open Systems Interconnection model.

3. The method of claim 2, wherein the data processing layer is a logical link control layer of the data link layer of the Open Systems Interconnection model.

4. The method of claim 1, wherein the data processing layer is a network layer of an Open Systems Interconnection model.

5. The method of claim 1, wherein each of the first multi-link device interface and the second multi-link device interface comprises a respective radio.

6. The method of claim 5, wherein the performance information comprises at least one of: a number of retries for each respective radio, a Channel Utilization (CU) for each respective radio, a current interface data rate for each respective radio, and an average buffer hold time for each respective radio.

7. The method of claim 5, wherein each respective radio transmits at at least one of 2.4 GHz, 5 GHz, and 6 GHz.

8. The method of claim 1, wherein selecting one of the first multi-link device interface and the second multi-link device interface is based on a type of traffic carried by the packet.

9. The method of claim 1, wherein selecting one of the first multi-link device interface and the second multi-link device interface is based on a quality of service indicated by the packet.

10. The method of claim 1, wherein selecting one of the first multi-link device interface and the second multi-link device interface is performed in substantially real-time and substantially continuously.

11. A device comprising:
    an interface configured to enable network communications;
    a memory; and
    one or more processors coupled to the interface and the memory, and configured to:
      establish at least a first multi-link device interface and a second multi-link device interface;
      expose, via a virtual data port, the first multi-link device interface and the second multi-link device interface at a data processing layer of the device;
      select one of the first multi-link device interface and the second multi-link device interface, as a selected multi-link device interface, based on performance information associated with a first radio and a second radio associated, respectively, with the first multi-link device interface and the second multi-link device interface; and
      wireless transmitting a packet from the device by routing the packet through the selected multi-link device interface.

12. The device of claim 11, wherein the data processing layer is a data link layer of an Open Systems Interconnection model.

13. The device of claim 12, wherein the data processing layer is a logical link control layer of the data link layer of the Open Systems Interconnection model.

14. The device of claim 11, wherein the data processing layer is a network layer of an Open Systems Interconnection model.

15. The device of claim 11, wherein each of the first multi-link device interface and the second multi-link device interface comprises a respective radio.

16. The device of claim 15, wherein the performance information comprises at least one of: a number of retries for each respective radio, a Channel Utilization (CU) for each respective radio, a current interface data rate for each respective radio, and an average buffer hold time for each respective radio.

17. The device of claim 15, wherein each respective radio transmits at at least one of 2.4 GHz, 5 GHz, and 6 GHz.

18. One or more non-transitory computer readable storage media encoded with instructions that, when executed by a processor, cause the processor to:
   establish at least a first multi-link device interface and a second multi-link device interface;
   expose, via a virtual data port, the first multi-link device interface and the second multi-link device interface at a data processing layer of a wireless device;
   select one of the first multi-link device interface and the second multi-link device interface, as a selected multi-link device interface, based on performance information associated with a first radio and a second radio associated, respectively, with the first multi-link device interface and the second multi-link device interface; and
   wireless transmitting a packet from the wireless device by routing the packet through the selected multi-link device interface.

19. The one or more non-transitory computer readable storage media of claim 18, wherein each of the first multi-link device interface and the second multi-link device interface comprises a respective radio.

20. The one or more non-transitory computer readable storage media of claim 19, wherein the performance information comprises at least one of: a number of retries for each respective radio, a Channel Utilization (CU) for each respective radio, a current interface data rate for each respective radio, and an average buffer hold time for each respective radio.

* * * * *